(12) United States Patent
Yabushita et al.

(10) Patent No.: US 10,946,521 B2
(45) Date of Patent: Mar. 16, 2021

(54) MOVEMENT PLANNING APPARATUS, MOVING ROBOT, AND MOVEMENT PLANNING PROGRAM

(71) Applicant: TOYOTA JIDOSHA KABUSHIKI KAISHA, Toyota (JP)

(72) Inventors: Hidenori Yabushita, Seto (JP); Nobuyuki Matsuno, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 329 days.

(21) Appl. No.: 16/019,713

(22) Filed: Jun. 27, 2018

(65) Prior Publication Data

US 2019/0015981 A1 Jan. 17, 2019

(30) Foreign Application Priority Data

Jul. 11, 2017 (JP) .............................. JP2017-135472

(51) Int. Cl.
   *G05B 19/04* (2006.01)
   *G05B 19/18* (2006.01)
   (Continued)

(52) U.S. Cl.
   CPC ............. *B25J 9/1666* (2013.01); *B25J 5/007* (2013.01); *B25J 9/162* (2013.01); *B25J 9/1664* (2013.01);
   (Continued)

(58) Field of Classification Search
   CPC ........ B25J 9/1666; B25J 9/1664; B25J 5/007; B25J 9/162; B25J 13/08; B25J 9/1676;
   (Continued)

(56) References Cited

U.S. PATENT DOCUMENTS

2007/0290040 A1* 12/2007 Wurman .............. G06Q 10/087
                                                                    235/385
2008/0269973 A1    10/2008 Kuroda
                        (Continued)

FOREIGN PATENT DOCUMENTS

JP      2006-205348 A      8/2006
JP      2007-319991 A      12/2007
                (Continued)

OTHER PUBLICATIONS

Liang Yang, "Survey of Robot 3D path planning algorithms", Journal of control science and engineering, vol. 2016, Article ID 7426913 (Year: 2016).*

(Continued)

*Primary Examiner* — Abby Y Lin
*Assistant Examiner* — Sohana Tanju Khayer
(74) *Attorney, Agent, or Firm* — Sughrue Mion, PLLC

(57) ABSTRACT

A movement planning apparatus includes: an acquiring unit configured to acquire an environmental map in which a no-entry area is indicated for each of turning angles that a moving robot may have; and a planning unit configured to search for a moving path that allows at least one search branch to be extended from a departure point to a destination point based on the environmental map without making a change in the turning angle become discontinuous and without passing the no-entry area, and determine the turning angle on the moving path to the destination point based on a predetermined condition.

7 Claims, 15 Drawing Sheets

(51) Int. Cl.
*B25J 9/16* (2006.01)
*B25J 5/00* (2006.01)
*G05D 1/02* (2020.01)
*B25J 13/08* (2006.01)

(52) U.S. Cl.
CPC .............. *B25J 9/1676* (2013.01); *B25J 13/08* (2013.01); *G05B 2219/40506* (2013.01); *G05D 1/0214* (2013.01); *G05D 2201/0214* (2013.01)

(58) Field of Classification Search
CPC ......... B25J 9/1602; G05B 2219/40506; G05D 2201/0214; G05D 1/0214; G01C 21/3446; G01C 21/3453
See application file for complete search history.

(56) References Cited

U.S. PATENT DOCUMENTS

| | | |
|---|---|---|
| 2009/0326713 A1 | 12/2009 | Moriya |
| 2010/0082196 A1 | 4/2010 | Sekiya |
| 2011/0166737 A1* | 7/2011 | Tanaka ................. G05D 1/0274 701/25 |
| 2017/0210008 A1* | 7/2017 | Maeda .................... B25J 9/1682 |
| 2018/0188026 A1* | 7/2018 | Zhang ....................... G06T 7/68 |
| 2018/0364731 A1* | 12/2018 | Liu ........................... G06T 7/74 |

FOREIGN PATENT DOCUMENTS

| | | |
|---|---|---|
| JP | 2008-276731 A | 11/2008 |
| JP | 2009-291540 A | 12/2009 |
| JP | 2010-79852 A | 4/2010 |
| JP | 2012-056064 A | 3/2012 |

OTHER PUBLICATIONS

Atsushi Watanabe, et al., "New navigation package for ROS realizing a 2-D/3-DOF seamless global-local planner", The 17th SICE System Integration Division Annual Conference, Dec. 2016, pp. 2691-2696.

* cited by examiner

MOVEMENT PLANNING APPARATUS, MOVING ROBOT, AND MOVEMENT PLANNING PROGRAM

CROSS REFERENCE TO RELATED APPLICATIONS

This application is based upon and claims the benefit of priority from Japanese patent application No. 2017-135472, filed on Jul. 11, 2017, the disclosure of which is incorporated herein in its entirety by reference.

BACKGROUND

The present disclosure relates to a movement planning apparatus, a moving robot, and a movement planning program.

A moving robot that autonomously moves to a target point has been known. The moving robot determines a path to the target point using an environmental map and moves along this path. For example, Japanese Unexamined Patent Application Publication No. 2009-291540 discloses a technology for evaluating the possibility that a robot may collide with an obstacle in a moving path.

SUMMARY

When the outer shape of a moving robot cannot be approximated by a simple shape such as a cylinder or a cube or when the moving robot grips a conveyance object in such a way that the conveyance object is projected even though the profile of the moving robot is simple, the whole outer shape of the moving robot needs to be correctly recognized and then a moving path and a turning angle, which is an orientation of the robot on the path, need to be planned. However, the conventional method of precisely recognizing the overall outer shape of the moving robot and then determining the moving path and the turning angle that prevent the robot from coming in contact with an obstacle requires an enormous amount of calculation, which may prevent a smooth movement of the robot.

The present disclosure has been made in order to solve these problems and provides a movement planning technology for an autonomous moving robot configured to determine a moving path to a destination point and turning angles on the path with a small amount of computation.

A movement planning apparatus according to a first aspect of the present disclosure is a movement planning apparatus configured to plan a moving path in which a moving robot autonomously moves from a departure point to a destination point, and a turning angle, which is a posture of the moving robot on a path of the moving path, the movement planning apparatus including: an acquiring unit configured to acquire an environmental map in which a no-entry area is indicated for each of turning angles that the moving robot may have; and a planning unit configured to search for the moving path that allows at least one search branch to be extended from the departure point to the destination point based on the environmental map without making the change in the turning angle become discontinuous and without passing the no-entry area, and determine the turning angle on the moving path to the destination point based on a predetermined condition.

As described above, the two-stage determination for determining first the moving path while it is confirmed that the turning angle does not become discontinuous during the movement and then determining the optimal turning angle during the movement is performed, whereby it is possible to dramatically reduce the amount of the computation compared to that in the case in which the moving path and the turning angle are searched in parallel and comprehensively. Accordingly, a movement plan can be created as soon as possible, whereby it is possible to achieve flexible autonomous movement of the moving robot.

Further, the environmental map in the aforementioned movement planning apparatus may include a three-dimensional structure in which a spatial layer is provided for each of the turning angles and the spatial layers are layered on one another in an order of the turning angles, the spatial layer being a layer in which a target space where the moving robot autonomously moves is partitioned into lattice-like grids, and each of the grids is classified as one of a permission grid in which entry of the moving robot is permitted and a prohibition grid in which the entry is prohibited at the turning angle that is associated with the grid. In this way, by using the environmental map of the three-dimensional structure in which grid maps for each turning angle at which the moving robot may turn are layered on one another in order, a movement at one turning angle can be handled in a way similar to the movement in the planar direction. Therefore, the existing path searching algorithm can also be applied to the turning angle direction. That is, since the movement in the turning angle can be handled in a way similar to the way the movement in the planar direction is handled, it is possible to promptly determine the turning angle during the movement.

In this case, the grid may be classified as the prohibition grid when the grid includes a Minkowski difference between the profile of the moving robot at the turning angle associated with the grid and an obstacle that is present in the target space. By using the Minkowski difference, it is possible to easily define the no-entry grid with respect to the turning angle of the moving robot.

Further, the aforementioned planning unit may guarantee the continuity of the change in the turning angle by continuously connecting the grid that includes the departure point and the grid that includes the destination point through the permission grids that are adjacent to each other in the three-dimensional structure. By using the grids as described above, the continuity of the change in the turning angle can be easily determined.

Further, when the planning unit finds a plurality of paths when it determines the moving path, the planning unit may select a path in which a path cost calculated for each path becomes minimum and set the selected path to be the moving path. The easiness of the movement between any pair of grids may vary from one pair of grids to another pair of grids due to structural restrictions of the moving robot, the environmental factor and the like of the target space. When the easiness is associated with the cost, it is possible to calculate the costs of the plurality of paths that have been found. By determining the moving path based on the costs of the paths that have been calculated, a path with a high moving efficiency can be selected.

In a similar way, the planning unit may define a path layer, which is a set of the grids along the moving path that has been determined, perpendicular to the spatial layer in the three-dimensional structure, select a grid trajectory in which a turning angle cost added to the change in the turning angle in the path layer becomes minimum, and determine the turning angle during the movement. As described above, by associating the change in the turning angle with the cost, it is possible to select a turning angle with a high turning efficiency, which is similar to the selection of the path.

While the aforementioned movement planning apparatus may be a server that is installed in a place physically apart from the moving robot as an entity, the moving robot itself may be configured to include the movement planning apparatus. If the moving robot itself has the entity of the movement planning apparatus, it is possible to definitely execute the autonomous movement even in an environment in which, for example, a communication environment is not good.

A movement planning program according to yet another aspect of the present disclosure is a movement planning program configured to plan a moving path in which a moving robot autonomously moves from a departure point to a destination point, and a turning angle, which is a posture of the moving robot on a path of the moving path, the movement planning program causing a computer to execute the following processing of: an acquiring step for acquiring an environmental map in which a no-entry area is indicated for each of turning angles that the moving robot may have; a moving path searching step for searching for the moving path that allows at least one search branch to be extended from the departure point to the destination point based on the environmental map without making the change in the turning angle become discontinuous and without passing the no-entry area; and a turning angle determining step for determining the turning angle on the moving path that has been searched based on a predetermined condition.

As described above, the two-stage determination for determining first the moving path while it is confirmed that the turning angle does not become discontinuous during the movement and then determining the optimal turning angle on the path is performed, whereby it is possible to dramatically reduce the amount of the computation compared to that in the case in which the moving path and the turning angle are searched in parallel and comprehensively. Accordingly, the movement plan can be created as soon as possible, whereby it is possible to achieve flexible autonomous movement of the moving robot.

According to this disclosure, it is possible to provide a movement planning technology for an autonomous moving robot configured to determine a moving path to a destination point and turning angles during the movement with a small amount of computation.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 11A is a diagram for describing a procedure for checking continuity of a change in a turning angle;
FIG. 11B is a diagram for describing the procedure for checking the continuity of the change in the turning angle;
FIG. 12A is a diagram for describing the procedure for checking the continuity of the change in the turning angle;
FIG. 12B is a diagram for describing the procedure for checking the continuity of the change in the turning angle.

DESCRIPTION OF EMBODIMENTS

While the present disclosure will be explained with reference to an embodiment of the present disclosure, the present disclosure set forth in claims is not limited to the following embodiment. Further, not all the structures explained in the embodiment are necessary as means for solving the problems.

Figure 1:
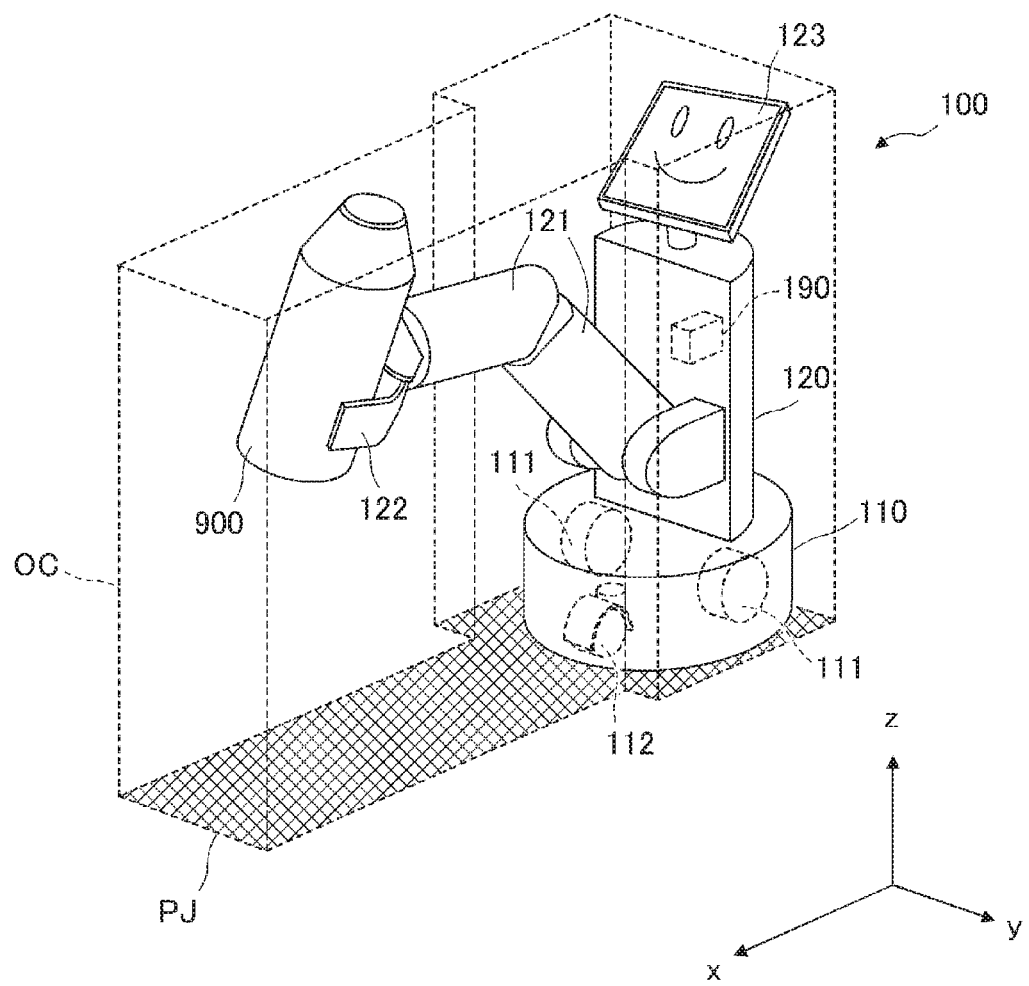
FIG. 1 is an external perspective view of a moving robot according to an embodiment.

FIG. 1 is an external perspective view of a moving robot 100 according to this embodiment. The moving robot 100 is mainly composed of a cart part 110 and a main body part 120.

The cart part 110 supports two driving wheels 111, each of which contacting the travelling surface, and one caster 112 in a cylindrically shaped housing. The two driving wheels 111 are disposed in such a way that the rotational axis cores thereof coincide with each other. The driving wheels 111 are respectively rotationally driven independently from each other by a motor (not shown). The caster 112, which is a trailing wheel, is disposed in such a way that a turning axis extended in the vertical direction from the cart part 110 supports the wheels so that there is some space between it and the rotational axes of the wheels, and tracks in accordance with a moving direction of the cart part 110.

The moving robot 100 goes straight forward when, for example, the two driving wheels 111 are rotated at the same rotational speed in the same direction, and turns around the vertical axis that passes the center of the two driving wheels 111 of the cart part 110 when, for example, they are rotated at the same rotational speed in the opposite directions. That is, the rotational direction and the rotational speed of the two driving wheels 111 are controlled, whereby the moving robot 100 can translate in a desired direction and turn to a desired posture. In order to achieve a translational movement more smoothly, the cart part 110 may be configured to be able to relatively rotate with respect to the main body part 120 or omnidirectional driving wheels such as Mecanum wheels may be employed.

The main body part 120 mainly includes a grip part composed of an arm 121 and a hand 122, and a display panel 123. The arm 121 and the hand 122 are driven by a motor (not shown), and grip various kinds of objects with a controlled posture. FIG. 1 shows a state in which the robot grips a conveyance object 900, which is, for example, a container. The display panel 123 is, for example, a liquid crystal panel, and displays a face of a character or information on the moving robot 100. The display panel 123 includes a touch panel on a display surface thereof, and is able to receive an instruction input from a user. Further, a control unit 190 is provided in the main body part 120. The control unit 190 includes a controller, a memory and the like that will be described later.

As shown in FIG. 1, regarding a target space in which the moving robot 100 moves, the floor surface which the driving wheels 111 contact is represented by the xy plane and the height direction is represented by the z axis. When the occupied space that surrounds the moving robot 100 including the conveyance object 900 is expressed by an occupied space OC indicated by the dotted line, a projection profile PJ on the xy plane has a polygonal shape shown by the shaded area. The occupied space OC is preferably expressed by a primitive set such as a rectangular parallelepiped, a triangle pole, and a cylindrical body for the purpose of simplifying calculations, although it can be defined by a more complicated shape. In the example shown in FIG. 1, the occupied space OC is expressed by a set of rectangular parallelepipeds. In this embodiment, a case in which the moving robot 100 moves and the occupied space OC and an obstacle interfere with each other is determined to be a collision.

Figure 2:
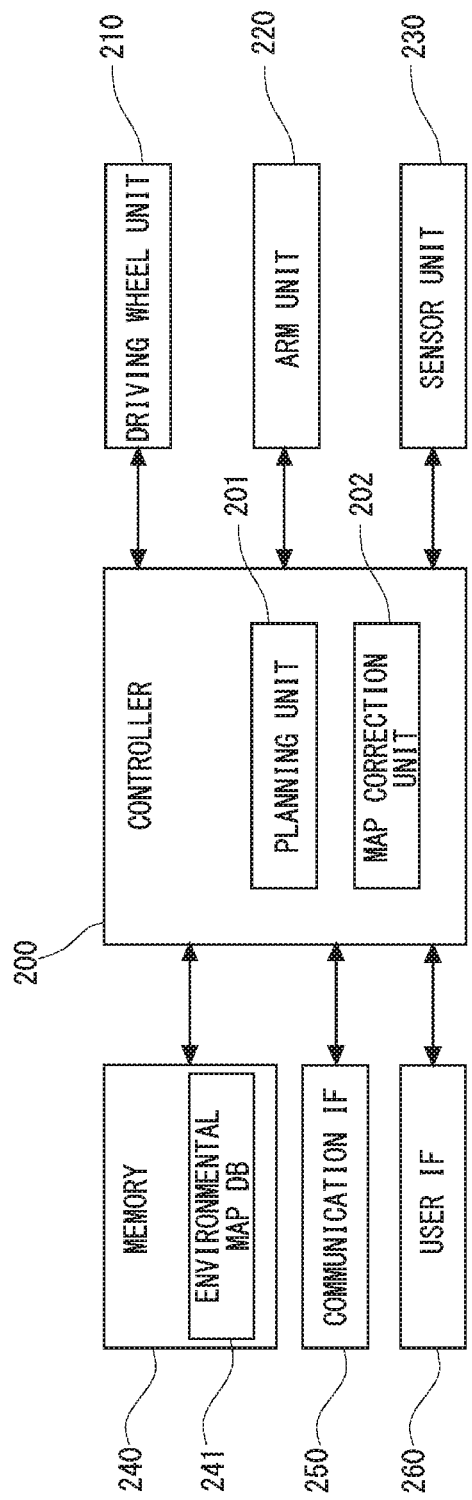
FIG. 2 is a control block diagram of the moving robot.

FIG. 2 is a control block diagram of the moving robot 100. A controller 200 is, for example, a CPU, and is stored in the control unit 190 of the main body part 120. A driving wheel unit 210, which includes a drive circuit or a motor for driving the driving wheels 111, is provided in the cart part 110. The controller 200 sends a drive signal to the driving wheel unit 210, thereby executing the control of the rotation of the driving wheels 111.

An arm unit 220, which includes a drive circuit or a motor to drive the grip part, is provided in the main body part 120. The controller 200 executes a grip control by sending a drive signal to the arm unit 220.

A sensor unit 230 includes various sensors that detect an obstacle during the movement and monitor the posture of the whole grip part that grips the conveyance object 900, and is disposed in the cart part 110 and the main body part 120 in a dispersed manner. The controller 200 drives the various sensors and acquires output from the sensors by sending a control signal to the sensor unit 230.

A memory 240 is a non-volatile storage medium and may be, for example, a solid state drive. The memory 240 stores, besides a control program for controlling the moving robot 100, various parameter values, functions, lookup tables and the like used for control. The memory 240 includes an environmental map DB 241 that stores an environmental map that expresses an environment in which the moving robot 100 autonomously travels.

A communication IF 250 is a communication interface for transmitting or receiving various kinds of information items and control signals to or from an external device and other autonomous moving robots in accordance with the control by the controller 200. The communication IF 250 is, for example, a wireless LAN unit. In this embodiment, the communication IF 250 also plays a role of receiving the environmental map created by the external device in advance. A user IF 260 is the display panel 123 or a speaker that outputs, for example, a synthetic voice. The user IF 260 is a user interface for providing information for the user in accordance with the control by the controller 200 and accepting instructions from the user.

The controller 200 also plays a role of a function calculation unit for executing various calculations regarding the control. A planning unit 201 determines a moving path from a departure point to a destination point and a turning angle on the moving path using the environmental map. A map correction unit 202 corrects the environmental map that has been acquired in advance and stored in the environmental map DB 241 in accordance with the projection profile PJ of the moving robot 100 that grasps the conveyance object 900. The specific calculations thereof will be described in order in detail.

Figure 3A:
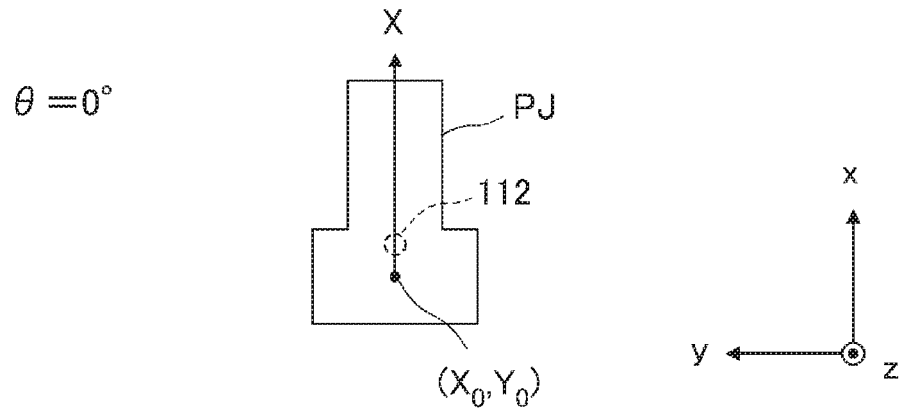
FIG. 3A is a diagram for describing a turn of the moving robot.
Figure 3B:
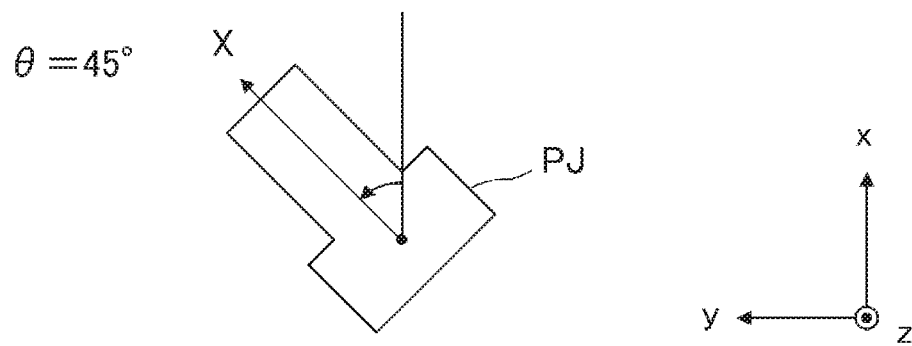
FIG. 3B is a diagram for describing the turn of the moving robot.

FIGS. 3A and 3B are diagrams for describing turns of the moving robot 100. The moving robot 100 can turn around the turning axis that passes the control center $(X_0, Y_0)$ that coincides with an approximate center of gravity of the cart part 110. When the direction of the caster 112 from the control center is defined to be the X-axis positive direction as the local coordinate system of the moving robot 100, the turning angle θ of the moving robot 100 can be expressed by the angle formed by the x-axis positive direction which is the coordinate system of the target space and the X-axis positive direction.

Figure 3C:
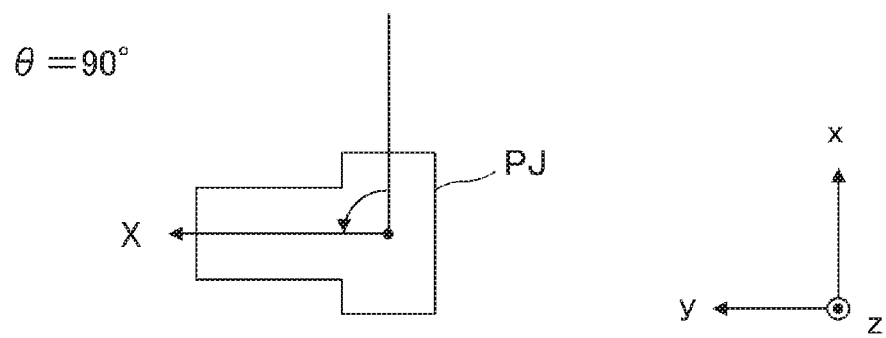
FIG. 3C is a diagram for describing the turn of the moving robot.

FIG. 3A shows the projection profile PJ when the turning angle θ is 0°. In a similar way, FIG. 3B shows the projection profile PJ when the turning angle θ is 45°, and FIG. 3C shows the projection profile PJ when the turning angle θ is 90°. Consider, for example, that the moving robot 100 moves in the x-axis direction and passes between two obstacles that are present in the y-axis direction with an interval therebetween. In this case, when the projection profile PJ is projected in the direction of the grip part as shown in the drawings, a case in which the moving robot 100 can pass between the two obstacles when the turning angle θ is 0° but cannot pass therebetween when the turning angle θ is 90° may occur.

Figure 4A:
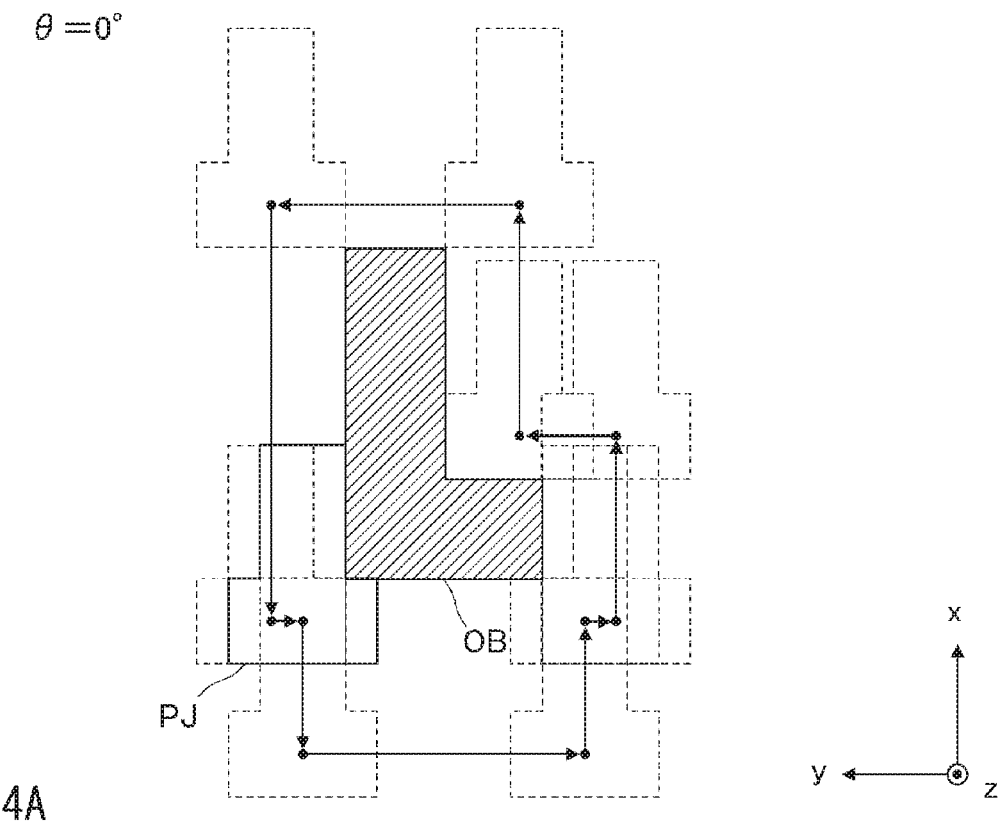
FIG. 4A is a diagram for describing the concept for defining a no-entry area of the moving robot.
Figure 4B:
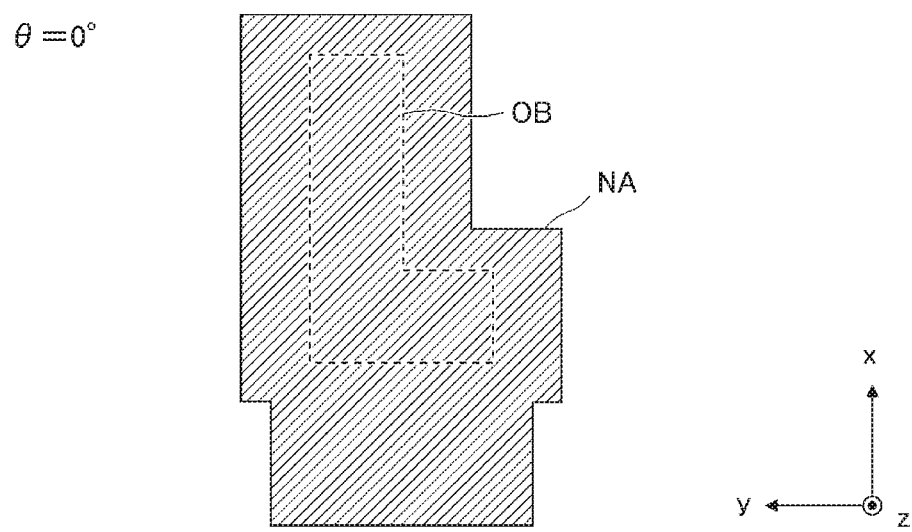
FIG. 4B is a diagram for describing the concept for defining the no-entry area of the moving robot.

In order to solve the above problem, in this embodiment, a no-entry area is defined for each turning angle of the moving robot 100 for the obstacle profile given as the environmental map. FIGS. 4A and 4B are diagrams for describing the concept for defining the no-entry area of the moving robot 100.

FIG. 4A shows a state in which the projection profile PJ is swept along the profile of the obstacle when the turning angle θ is 0°. Specifically, the projection profile PJ is slid with respect to the fixed obstacle profile OB in such a way that at least one point of the projection profile PJ with the angle θ of 0° contacts the obstacle profile OB (in this example, this profile has an L shape) expressed on the environmental map. Then, as shown in FIG. 4A, the control center $(X_0, Y_0)$ draws the decagonal trajectory indicated by the arrow.

FIG. 4B is a diagram showing the no-entry area NA when the turning angle θ is 0°. The no-entry area NA is a region which the control center $(X_0, Y_0)$ cannot enter when the moving robot 100 has this turning angle. That is, the no-entry area NA is defined to be the region inside the sweep trajectory indicated by the arrow in FIG. 4A. As shown in FIG. 4B, the no-entry area NA is a region in which the obstacle profile OB has been extended, dependent upon the projection profile PJ and the turning angle θ=0°. Specifically, the no-entry area NA is the Minkowski difference of the projection profile PJ with the turning angle θ of 0° with respect to the obstacle profile OB.

Figure 5A:
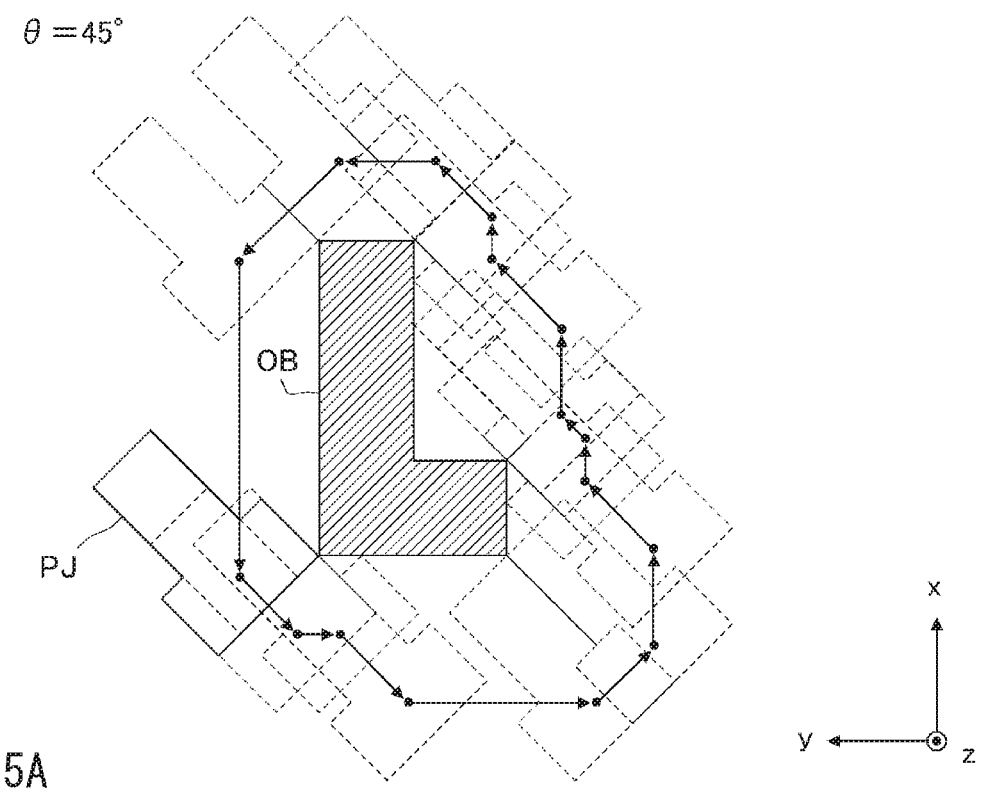
FIG. 5A is a diagram for describing the concept for defining the no-entry area of the moving robot.
Figure 5B:
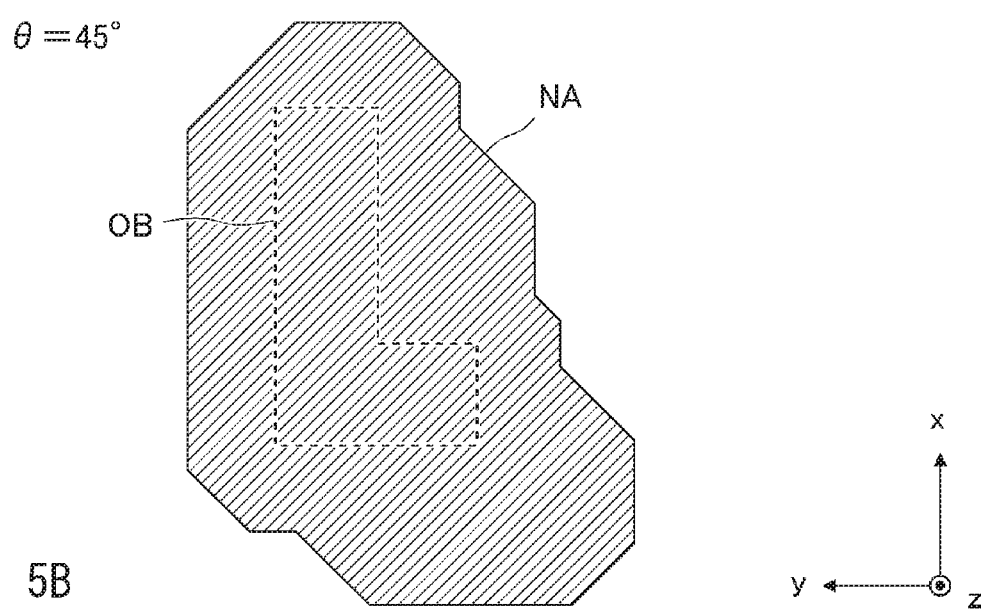
FIG. 5B is a diagram for describing the concept for defining the no-entry area of the moving robot.

FIGS. 5A and 5B are diagrams for describing the concept for defining the no-entry area of the moving robot 100 when the turning angle θ is 45° in a way similar to that in FIGS. 4A and 4B. FIG. 5A shows a state in which the projection profile PJ is swept along the profile of the obstacle when the turning angle θ is 45°. Specifically, the projection profile PJ is slid with respect to the fixed obstacle profile OB in such a way that at least one point of the projection profile PF with the angle θ of 45° contacts the obstacle profile OB expressed on the environmental map. Then, as shown in the drawings, the control center $(X_0,Y_0)$ draws the hexadecagonal trajectory indicated by the arrow.

FIG. 5B is a diagram showing the no-entry area NA when the turning angle θ is 45°. The no-entry area NA is determined to be the region inside the sweep trajectory indicated by the arrow in FIG. 5A. As shown in FIG. 5B, the no-entry area NA is the region in which the obstacle profile OB is extended, dependent upon the projection profile PJ and the turning angle θ=45°. Specifically, while the no-entry area NA is the Minkowski difference of the projection profile PJ with the turning angle θ of 45° with respect to the obstacle profile OB, the shape thereof is different from that when the turning angle θ is 0°.

Figure 6A:
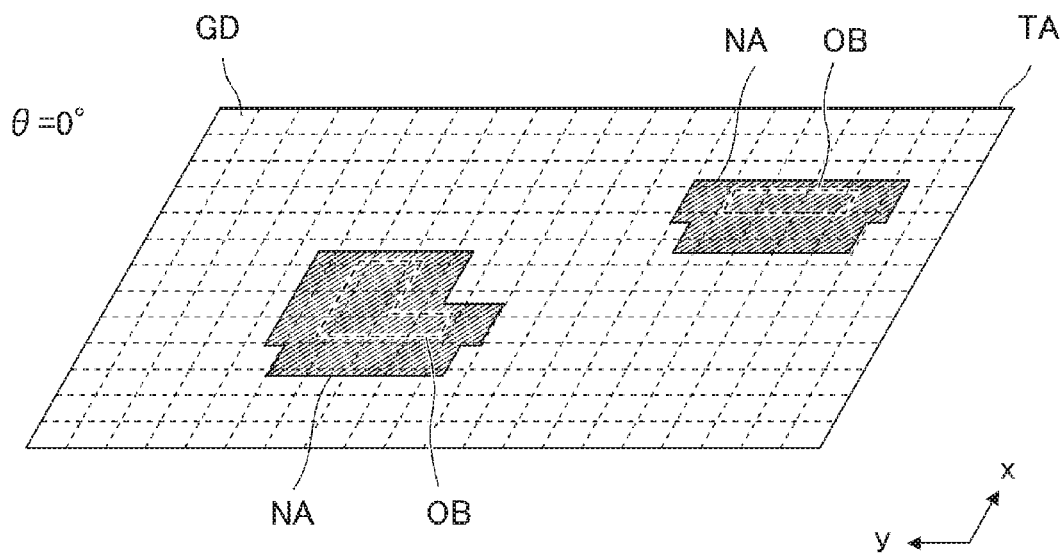
FIG. 6A is a diagram for describing a procedure for creating spatial layers of an environmental map.
Figure 6B:
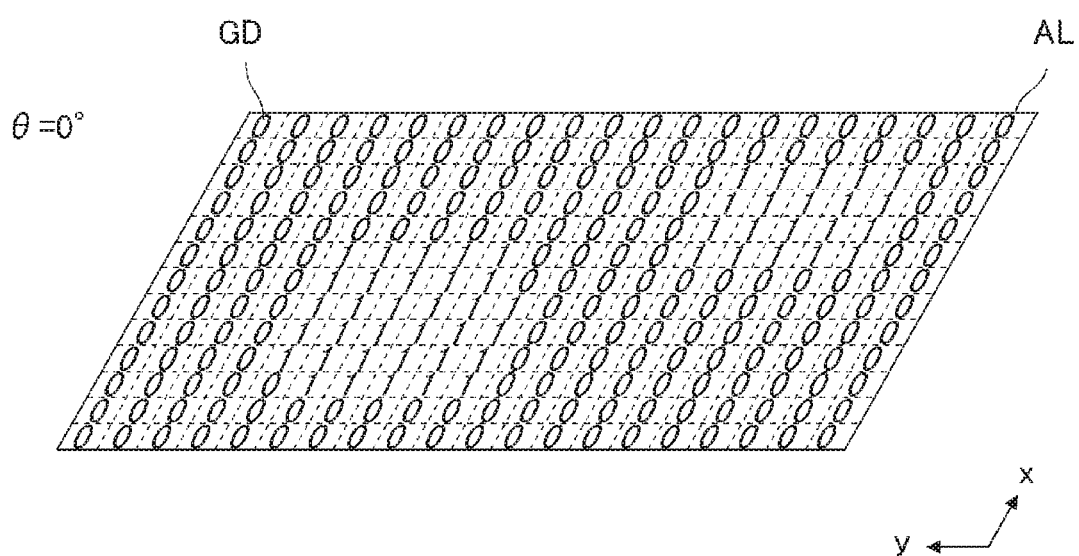
FIG. 6B is a diagram for describing the procedure for creating the spatial layers of the environmental map.

FIGS. 6A and 6B are diagrams for describing a procedure for creating the spatial layers of the environmental map. Specifically, FIGS. 6A and 6B show the procedure for embodying the no-entry area NA generated for each turning angle θ in the map information. FIG. 6A shows one example in which the target space TA is partitioned into lattice-like grids GD and the no-entry area NA is defined, the no-entry area NA being obtained by extending the obstacle profile OB drawn in accordance with the corresponding position and the size under the condition of the turning angle θ=0°. The size of the grid GD is determined in advance depending on conditions such as an amount of calculation that can be allowed. Further, the coordinates $(x_n,y_n)$ of each of the grids GD are expressed in accordance with the coordinate system of the target space.

FIG. 6B shows the spatial layer AL with the turning angle θ of 0°. The spatial layer AL is a map layer that expresses the environmental map in each of the turning angles. The spatial layer AL indicates whether each of the partitioned grids GD permits or prohibits entry of the control center $(X_0,Y_0)$ of the moving robot 100. Specifically, in each of the grids GD, when at least a part of the grid GD includes the no-entry area NA, this grid GD is classified as a prohibition grid. When the grid GD does not include the no-entry area NA at all, this grid GD is classified as a permission grid. By expressing the prohibition grid by "1" and the permission grid by "0", the target space TA shown in FIG. 6A can be expressed as the spatial layer AL in which "1" or "0" is associated with each of the grids GD as shown in FIG. 6B.

Figure 7:
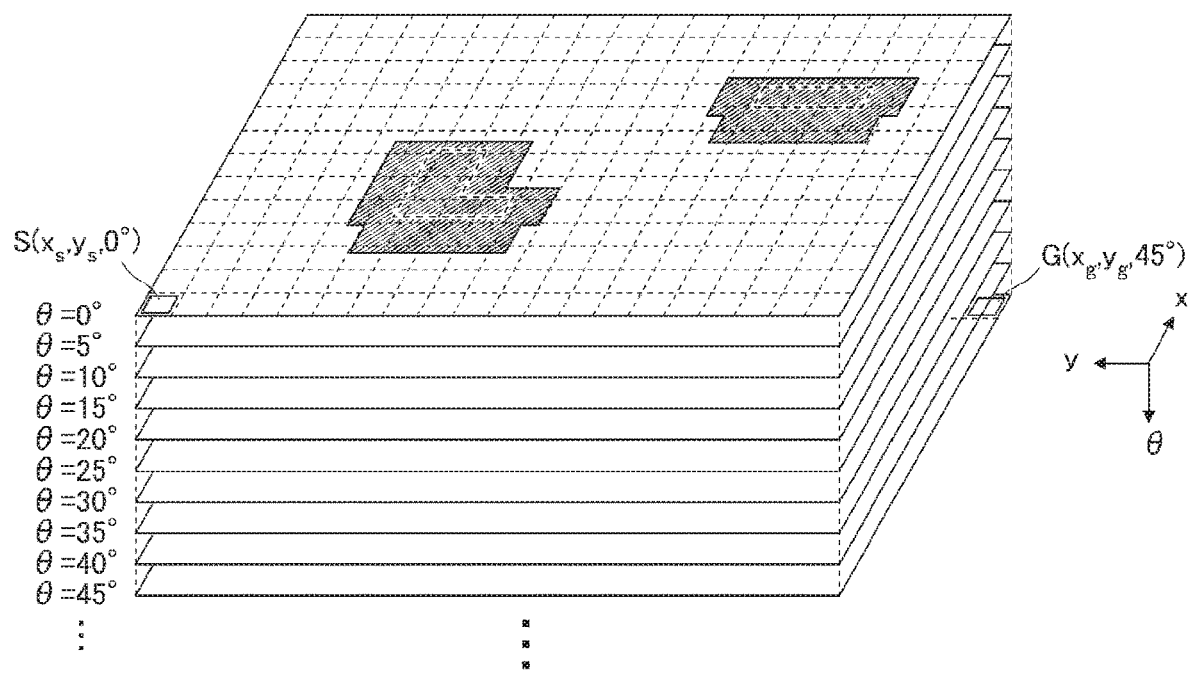
FIG. 7 is a diagram for describing a three-dimensional structure of the environmental map.

When the spatial layer AL is created for each turning angle, the spatial layers AL are layered on one another in the order of the turning angle to complete the environmental map. FIG. 7 is a diagram for describing the three-dimensional structure of the environmental map. While "1" or "0" is associated with each grid GD in the spatial layer AL as shown in FIG. 6B, FIG. 7 shows a diagram in which the no-entry area NA overlaps the grid GD, as shown in FIG. 6A, for conceptual understanding. In the following several drawings, the spatial layer AL is expressed in this way.

The step angle of the turning angle θ is determined while the amount of calculation that can be allowed or the like is being taken into consideration. In this example, the step angle is set to 5°. That is, 72 spatial layers AL whose turning angle θ is from 0° to 355° are created and are layered on one another. Since the turning angle θ is 360°, which is equal to 0°, it can be considered that the spatial layer AL with the turning angle θ of 0° and the spatial layer AL with the turning angle θ of 355° are layered on one another in such a way that they are adjacent to each other.

In the environmental map expressed as stated above, the departure point S is expressed by the three-dimensional coordinates $(x_s,y_s,\theta_s)$ of the coordinates of the departure point and the turning angle, which is the initial posture at the departure point, and the destination point G is expressed by the three-dimensional coordinates $(x_g,y_g,\theta_g)$ of the coordinates of the destination point and the turning angle, which is the target posture at the destination point. When, for example, the turning angle θ at the departure point is 0°, as shown in FIG. 7, the departure point grid $GD_s$ is defined on the spatial layer AL with the turning angle θ of 0°. When the turning angle θ at the destination point is 45°, as shown in FIG. 7, the destination point grid $GD_g$ is defined on the spatial layer AL with the turning angle θ of 45°. When there is no grid GD that coincides with the specified coordinates and the specified turning angle, the closest grid GD is selected.

In this embodiment, the planning unit 201 selects the trajectory from the departure point grid $GD_s$ to the destination point grid $GD_g$ through the grids GD that are adjacent to each other vertically or horizontally in the three-dimensional structure, thereby determining the moving path and the turning angles on the path. This procedure will be explained below.

Figure 8:
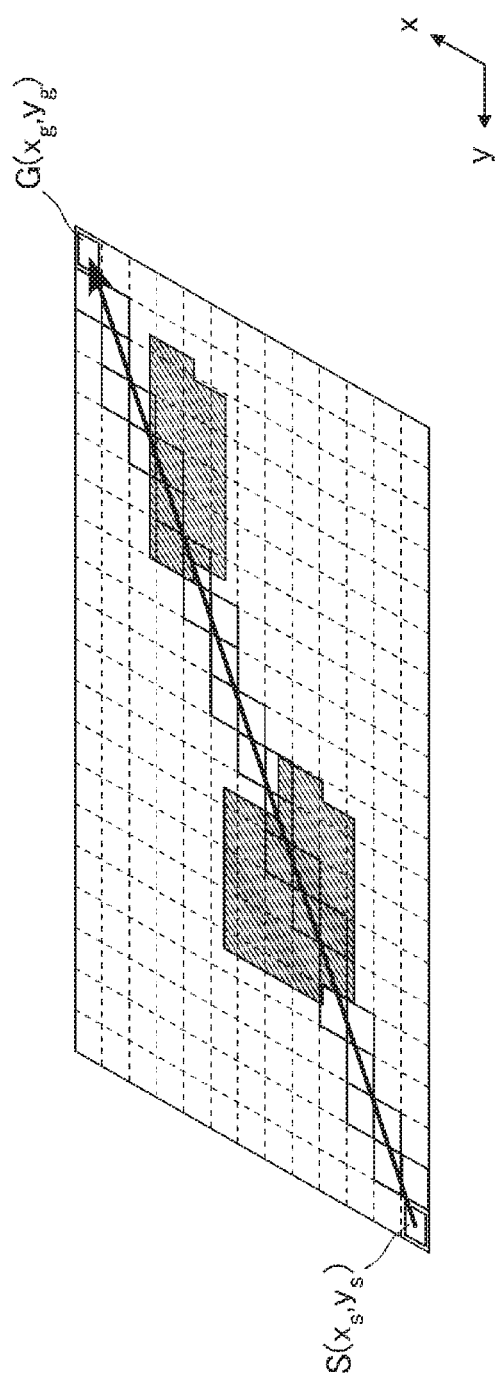
FIG. 8 is a diagram for describing a procedure for determining a moving path.

FIG. 8 is a diagram for describing the procedure for determining the moving path. The planning unit 201 first determines the moving path. In order to determine the moving path, the turning angle is mapped first and the coordinates of the departure point $S(x_s,y_s)$ and the coordinates $G(x_g,y_g)$ of the destination point are focused. In this case, as indicated by the arrow in FIG. 8, the shortest moving path is the line that connects the coordinate S to the coordinate G. This vector is referred to as a straight vector.

By selecting and connecting the grids GD along this straight vector, the trajectory indicated by the grid GD surrounded by the thick frame can be obtained. If this trajectory can be employed, this trajectory can be determined to be the moving path. In reality, however, there may be a prohibition grid on the path and thus the robot may not be able to pass even when the turning angle is changed. Then, using this trajectory as a first provisional moving path, it is checked whether the robot can reach from the departure point grid $GD_s$ to the destination point grid $GD_g$ in this first provisional moving path without making the turning angle become discontinuous.

When it is confirmed that the robot can reach the destination point grid $GD_g$ if the robot has at least one of the turning angles, this first provisional moving path is determined to be the moving path along which the moving robot 100 moves. When the robot cannot reach the destination point grid $GD_g$ in the first provisional moving path, the next trajectory that is close to the straight vector is set as a second provisional moving path, and it is confirmed whether the robot can reach the destination point grid $GD_g$ in a way similar to the above way. The provisional moving path is repeatedly configured until it is confirmed that the robot can reach the destination point grid $GD_g$ if the robot has at least one of the turning angles, and the confirmed provisional moving path is determined to be the moving path along which the moving robot 100 moves. This procedure will be described in further detail.

Figure 9:
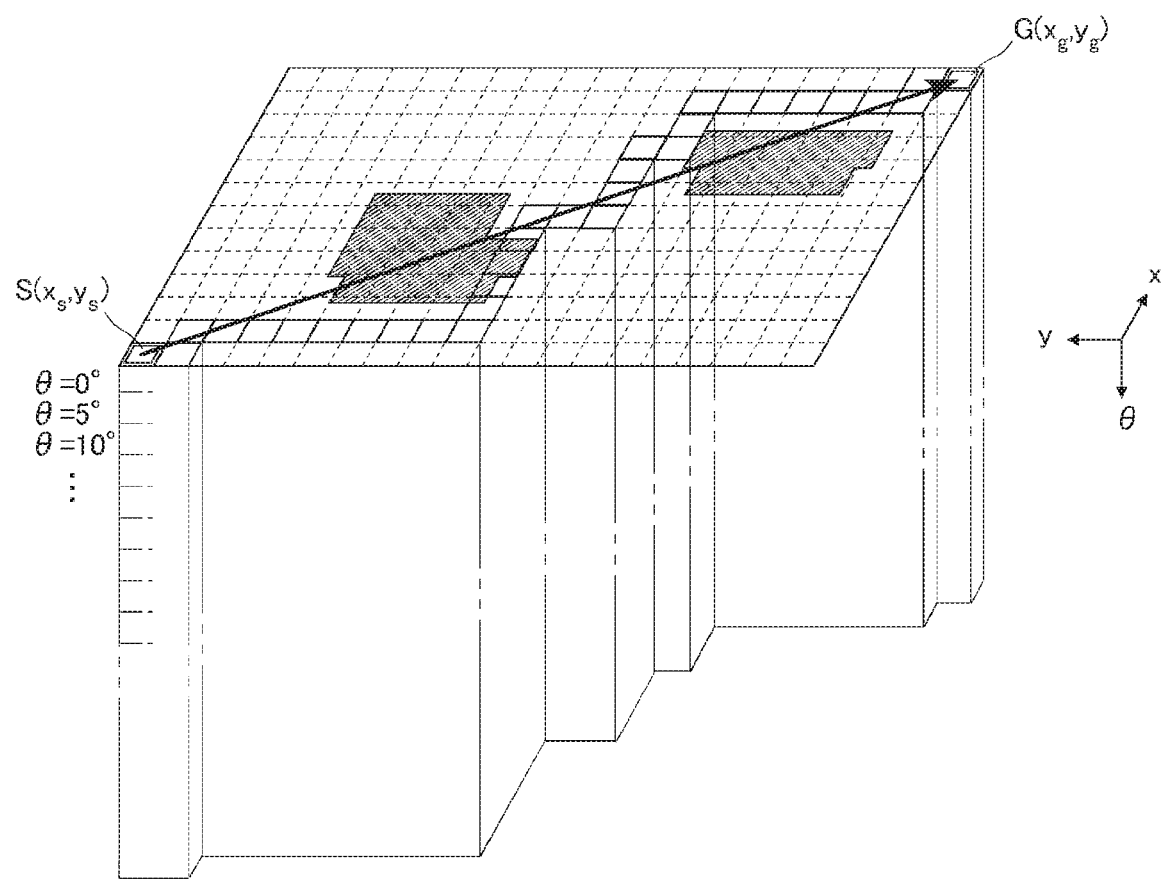
FIG. 9 is a diagram showing a relation between a provisional moving path and a spatial layer for each turning angle.

FIG. 9 is a diagram showing a relation between the provisional moving path and the spatial layer AL for each turning angle. In FIG. 9, the trajectory shown by the grid GD surrounded by the thick frame indicates the provisional moving path set for the m (m is an integer equal to or larger than two)-th time. That is, it means that the robot could not reach from the departure point grid $GD_s$ to the destination point grid $GD_g$ in the provisional moving paths set from the first time to the (m−1)-th time no matter which angle the robot has.

After the planning unit 201 sets the m-th provisional moving path, the planning unit 201 defines a set of grids GD along the provisional moving path perpendicular to the spatial layer AL in the three-dimensional structure of the environmental map to be a provisional path layer. Since the direction perpendicular to the spatial layer is the θ axis, when focus is given to one grid GD in the spatial layer, the set of the grids GD perpendicular to the spatial layer is the set of the grids GD whose coordinates are the same as those of the grid GD and turning angles θ are different from one another. Conceptually, the set of the grids GD can be expressed as one grid pillar along the θ axis.

Figure 10:
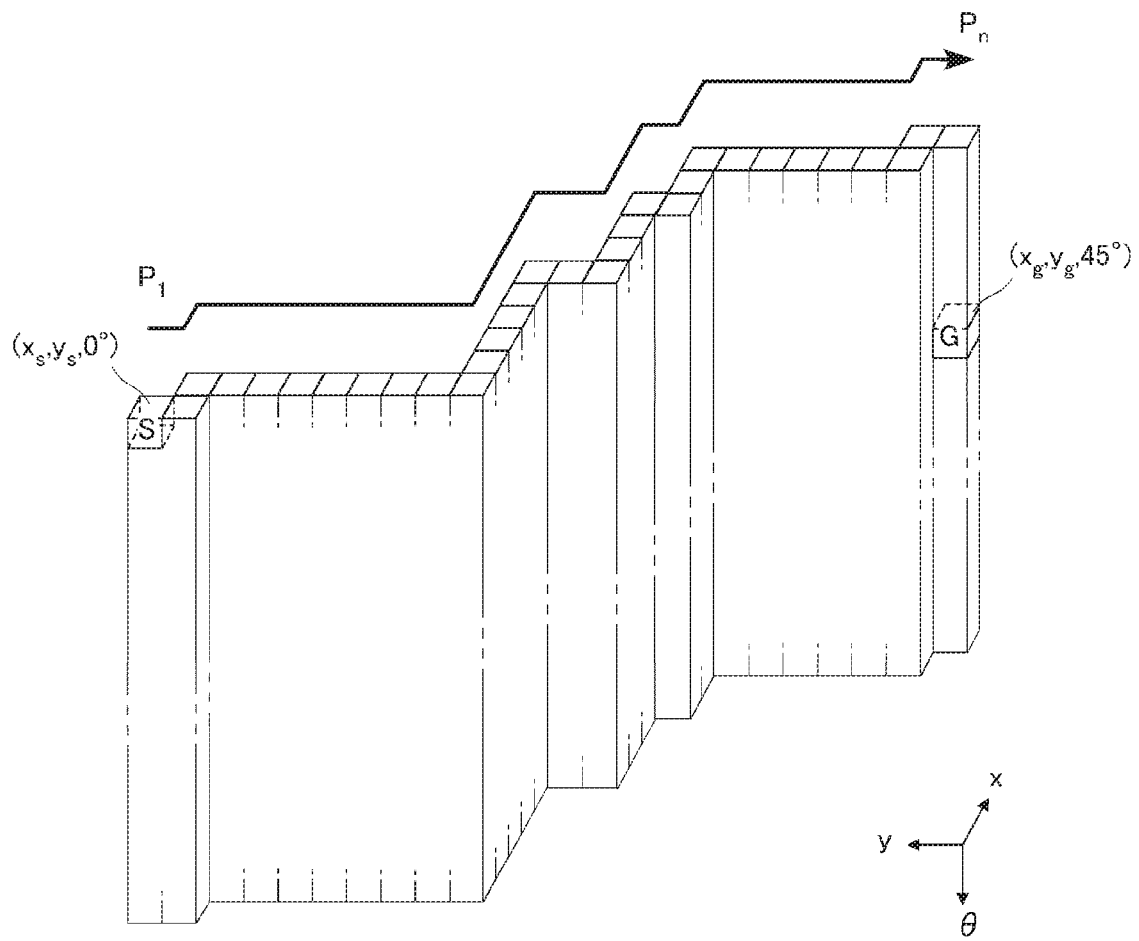
FIG. 10 is a diagram for describing a provisional path layer.

Therefore, the connection of grid pillars along the provisional moving path is the provisional path layer. FIG. 10 is a diagram for describing the provisional path layer along the provisional moving path shown in FIG. 9. The arrow indicates the provisional moving path, and it is assumed that the number of grid pillars that compose the provisional path layer is n, that is, from $P_1$ to $P_n$ that are adjacent to one another. The departure point grid $GD_s$ is included in one grid GD in the first grid pillar (in the examples shown in FIG. 10, the grid GD with the angle θ of 0°), and the destination point grid $GD_g$ is included in one grid GD in the n-th grid pillar (in the examples shown in FIG. 10, the grid GD with the angle θ of 45°).

The planning unit 201 checks whether the robot can reach from the departure point grid $GD_s$ to the destination point grid $GD_g$ if the robot has at least one of the turning angles in the provisional path layer thus defined. Specifically, the P axis, which is a path obtained by stretching the path from $P_1$ to $P_n$ along the provisional moving path, is set, grids GD are aligned on the Pθ plane, and the continuity of the change in the turning angle is checked.

Figures 11A, 11B:
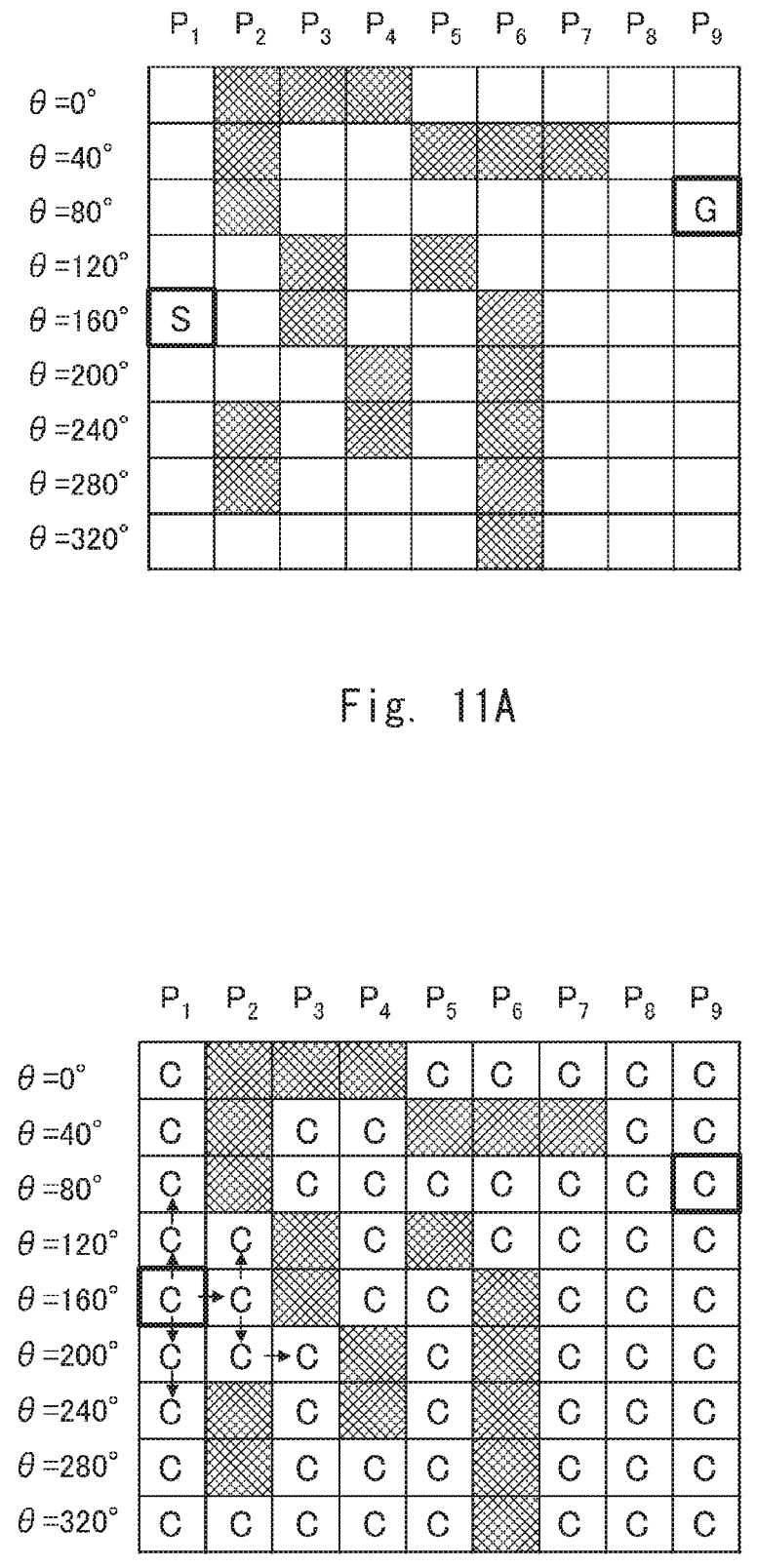

FIGS. 11A and 11B are diagrams for describing a procedure for checking the continuity of the change in the turning angle. While the step angle of the turning angle θ in the spatial layer AL in FIGS. 7 to 10 is set to 5°, the step angle is set to 40° in FIGS. 11A and 11B for the sake of simplification of the description. Further, the number of grids GD in the P axis is set to n=9.

FIG. 11A shows a state of the provisional path layer cut out of the environmental map. The departure point grid $GD_s$ is specified to be the grid GD with the angle θ of 160° and the destination point grid $GD_g$ is specified to be the grid GD with the angle θ of 80°. Further, the shaded grids GD are prohibition grids to which "1" has been given and the other grids GD are permission grids to which "0" has been given.

FIG. 11B is a diagram for describing the method of checking the continuity of the change in the turning angle. The planning unit 201 first gives the symbol "C" to the departure point grid $GD_s$. Then the planning unit 201 also gives "C" to the permission grid that is adjacent to the departure point grid $GD_s$. Further, the planning unit 201 also gives "C" to the permission grid that is adjacent to the permission grid to which "C" has been given. The "grids GD that are adjacent to each other" also include a pair of the grid GD with the angle θ of 0° and the grid GD with the angle θ of 320°, both of which are in the same P column.

Every time the local path is extended, the above operation is repeated until there is no longer any permission grid to which "C" should be given. As a result, if "C" is given to a grid GD on a path extended from the local path, the planning unit 201 determines that the continuity of the change in the turning angle has been guaranteed. In other words, it is determined that at least one search branch could be extended from the departure point grid $GD_s$ to one grid GD without passing the prohibition grid and without making the change in the turning angle become discontinuous. As shown in FIG. 11B, in this example, "C" is given to the destination point grid $GD_g$. Therefore, the continuity of the change in the turning angle on this path is guaranteed. The planning unit 201 determines this provisional moving path to be the moving path along which the moving robot 100 moves as it has been confirmed that the robot can reach from the departure point grid $GD_s$ to the destination point grid $GD_g$ when the robot has at least one of the turning angles.

Figures 12A, 12B:
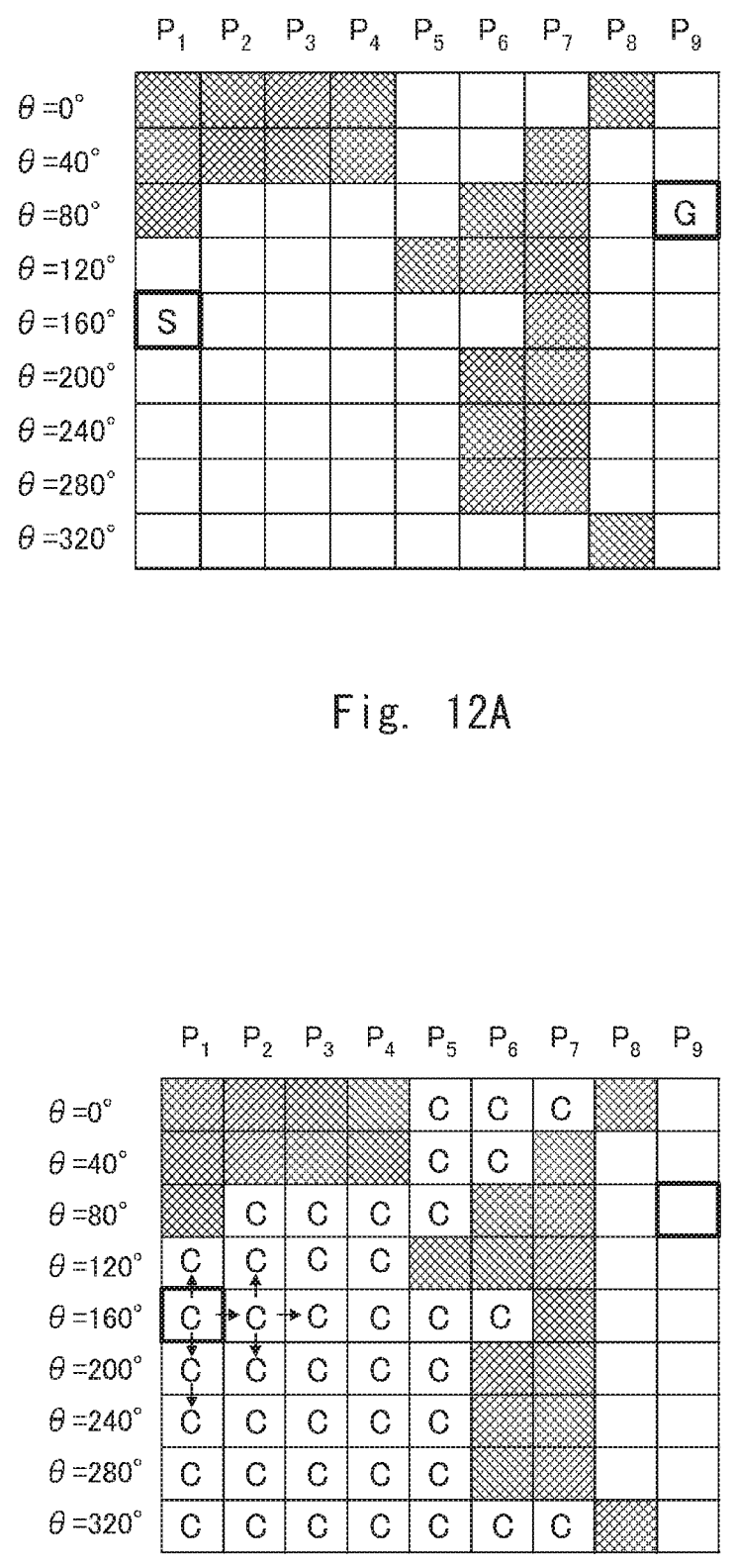

FIGS. 12A and 12B are diagrams for describing the procedure for checking the continuity of the change in the turning angle, and show examples other than those shown in FIGS. 11A and 11B. In FIGS. 12A and 12B, similar to FIGS. 11A and 11B, the step angle of the turning angle θ is set to 40° and the number of grids GD in the P axis is set to n=9.

FIG. 12A shows a state of the path layer cut out of the environmental map. The departure point grid $GD_s$ is specified as the grid GD with the angle θ of 160° and the destination point grid $GD_g$ is specified as the grid GD with the angle θ of 80°. Further, the shaded grids GD are prohibition grids to which "1" has been given, and the other grids GD are permission grids to which "0" has been given. The pattern of the prohibition grids shown in FIG. 12A is different from that shown in FIG. 11A.

FIG. 12B is a diagram for describing a method of checking the continuity of the change in the turning angle, similar to FIG. 11B. The planning unit 201 first gives the symbol "C" to the departure point grid $GD_s$. Then the planning unit 201 also gives "C" to the permission grid that is adjacent to the departure point grid $GD_s$. Further, the planning unit 201 also gives "C" to the permission grid that is adjacent to the permission grid to which "C" has been given.

Even when the aforementioned operation is repeated until there is no longer any permission grid to which "C" should be given, in the example shown in FIG. 12B, "C" is not given to the destination point grid $GD_g$. Specifically, two grids GD with the angles θ of 0° and 320° in the $P_8$ column and seven grids GD from the angle θ of 40° to the angle θ of 280° in the $P_7$ column serve as a wall that separates the region on the side of the departure point grid $GD_s$ from the region on the side of the destination point grid $GD_g$. That is, there is no trajectory that allows connection of the two grids without making the turning angle become discontinuous.

Various methods can be employed to set the provisional moving path. In the aforementioned example, a method of setting the path that is closer than other paths to the straight vector preferentially as the provisional moving path has been employed. However, another element may be added to set the determination criteria. For example, a path that is straighter than other paths may be preferentially set as the provisional moving path.

Further, in the aforementioned example, when one provisional moving path in which the continuity of the change in the turning angle has been guaranteed has been found, this provisional moving path is determined to be the determined moving path. Alternatively, a plurality of provisional moving paths in which the continuity of the change in the turning angle has been guaranteed are found, then a preferable provisional moving path may be selected from among them, and the selected provisional moving path may be determined to be the determined moving path. In this case, the provisional moving path in which the path cost calculated for each provisional moving path becomes minimum may be selected. Specifically, the cost for the movement between grids that are adjacent to each other on the xy plane may be determined in advance, and the provisional moving path in which the total cost accumulated up to the timing when the robot reaches the destination point becomes minimum is selected. The cost for the movement between predetermined grids is determined, for example, in proportion to the distance between these grids. As a matter of course, a further adjustment may be added. For example, a higher cost may be imposed when the grid is close to the obstacle.

Next, a procedure for determining the turning angle during the movement after the moving path is determined will be explained. FIGS. 13A-13D are diagrams for describing the procedure for determining the turning angle during the movement. As described above, when one moving path has been determined, the planning unit 201 generates all the trajectories of the grids GD that connect the departure point grid $GD_s$ and the destination point grid $GD_g$ on the Pθ plane, which is the path layer thereof. The diagrams shown in FIGS. 13A to 13D show four of the plurality of grid trajectories that connect the departure point grid $GD_s$ and the destination point grid $GD_g$ in the example shown in FIG. 11.

Figure 13A:
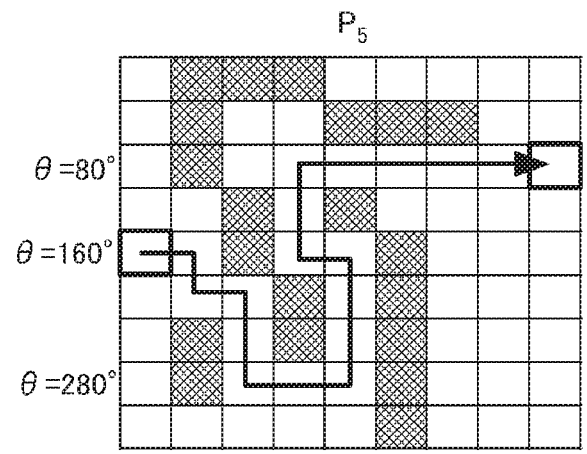
FIG. 13A is a diagram for describing a procedure for determining the turning angle during the movement.
Figure 13B:
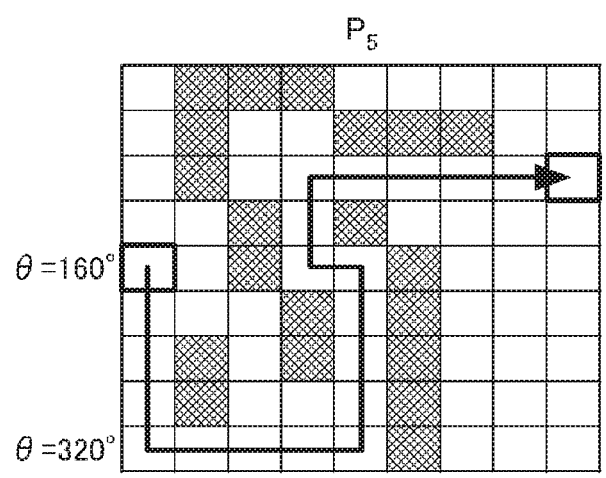
FIG. 13B is a diagram for describing the procedure for determining the turning angle during the movement.
Figure 13C:
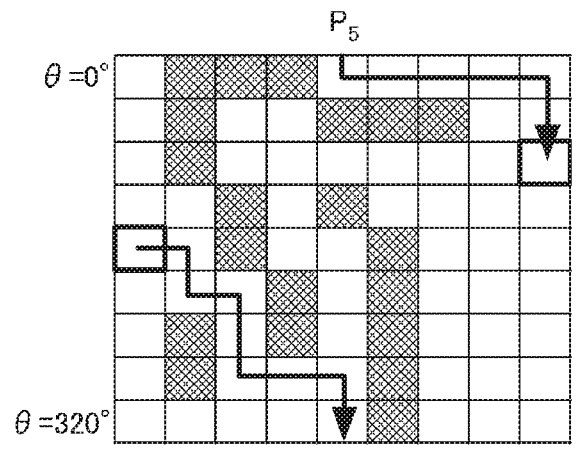
FIG. 13C is a diagram for describing the procedure for determining the turning angle during the movement.
Figure 13D:
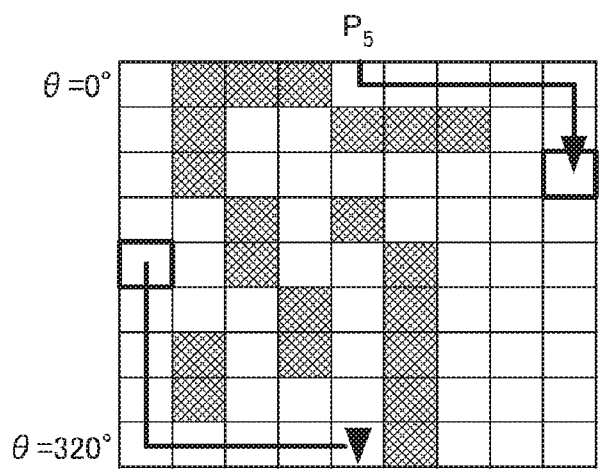
FIG. 13D is a diagram for describing the procedure for determining the turning angle during the movement.

In the grid trajectory shown in FIG. 13A, the robot can reach the destination point grid $GD_g$ while turning only in a range from θ=80° to θ=280°. In the grid trajectory shown in FIG. 13B, the robot has an angle θ of 160°, which corresponds to the initial posture, at the departure point, and then turns to the angle θ of 320°, and advances to the $P_5$ column with the same posture. In the grid trajectory shown in FIG. 13C, the robot repeats the straight forward movement and turning and turns the posture from the initial posture to the target posture beyond θ=360° (=0°). In the grid trajectory shown in FIG. 13D, the robot has an angle θ of 160°, which corresponds to the initial posture, at the departure point, and then turns to the angle θ of 320°, and advances to the $P_5$ column with the same posture, similar to the movement in FIG. 13B. In FIG. 13D, the robot then turns to the angle θ of 0° and then goes to the destination point grid $GD_g$.

Various methods may be employed to select the grid trajectory. In this example, by selecting the grid trajectory in which the turning angle cost added to the change in the turning angle in the path layer becomes minimum, the turning angle during the movement is determined. The turning angle cost is a predetermined cost accumulated when the robot moves between the grids adjacent to each other in the path layer, and is set in such a way that the cost is in proportion to, for example, the magnitude of the turning angle. The cost to be set may be adjusted in such a way that, for example, a large cost is added when a grid is close to the obstacle, a smaller cost is added in a case where the robot turns by a great degree by one change than the cost added in a case where the robot turns by a small degree frequently, or a large cost is added to a specific turning angle due to hardware restrictions of the moving robot 100.

As described above, by using the environmental map of the three-dimensional structure in which the grid maps for each turning angle at which the moving robot 100 may turn are layered on one another in order, a change in the turning angle can be handled in a way similar to the movement in the planar direction (xy plane), whereby the existing path searching algorithm can also be applied to the turning angle direction (Pθ plane). That is, since the change in the turning angle can be handled in a way similar to the movement in the planar direction, it is possible to promptly determine the turning angle during the movement.

As described above, the moving robot 100 according to this embodiment performs the two-stage determination for determining first the moving path while confirming that the turning angle does not become discontinuous during the movement and then determining the optimal turning angle during the movement. By performing the two-stage determination, it is possible to dramatically reduce the amount of the computation compared to the conventional method in which the moving path and the turning angle are searched in parallel and comprehensively. Accordingly, the movement plan can be created as soon as possible, whereby it is possible to achieve flexible autonomous movement of the moving robot 100.

After one grid trajectory has been selected based on the predetermined condition by the employed method, the planning unit 201 determines the turning angle by the grid trajectory as the turning angle during the movement. The moving robot 100 executes the autonomous movement toward the destination point in accordance with the thus planned moving path and the turning angles in each section in this moving path.

Figure 14:
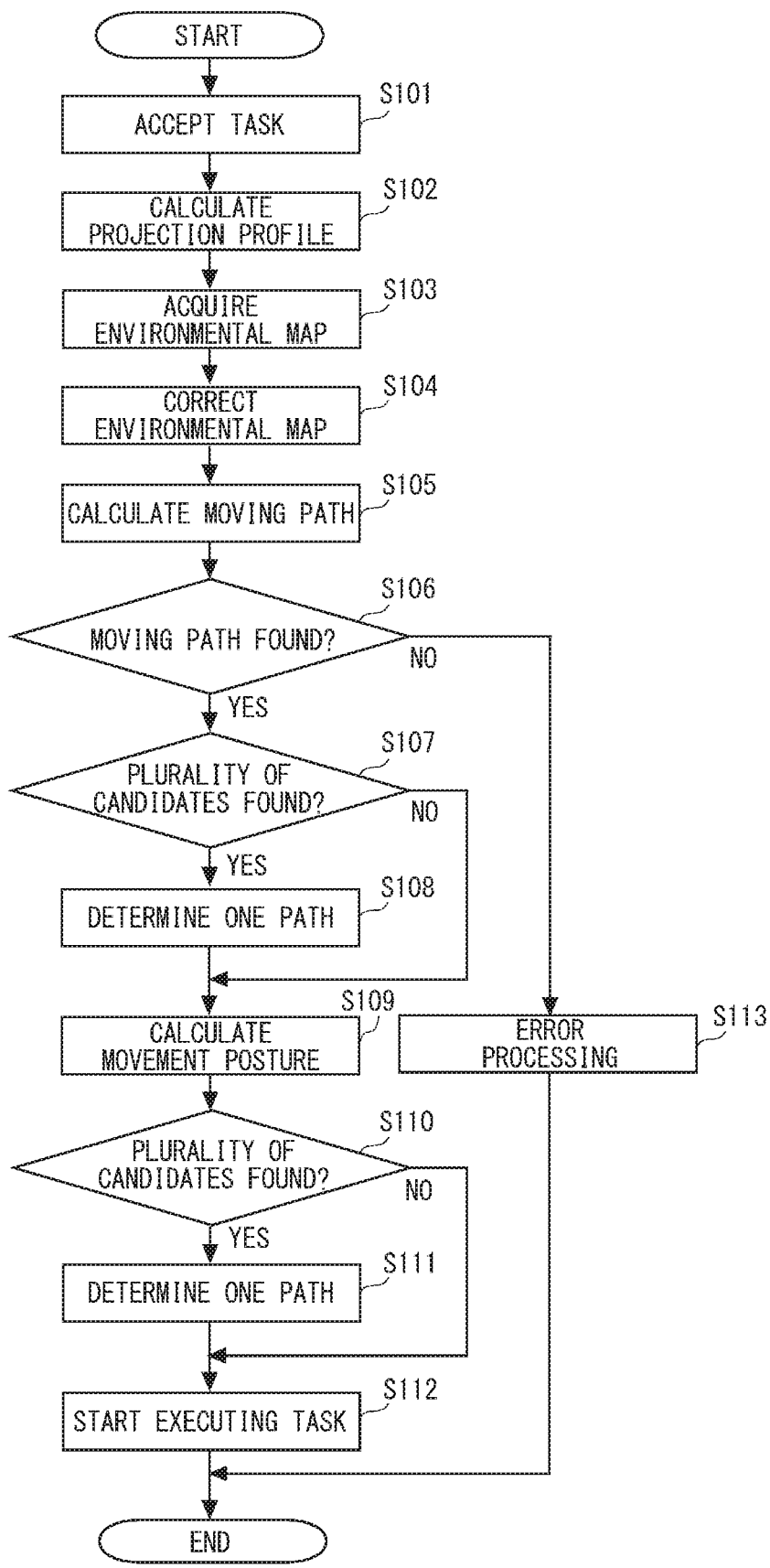
FIG. 14 is a flowchart showing a processing procedure of the moving robot.

Next, the processing procedure in the autonomous movement of the moving robot 100 will be explained. FIG. 14 is a flowchart showing the processing procedure in the autonomous movement of the moving robot 100. The flow starts from a state in which the moving robot 100 is activated and waits for a task to be input.

In Step S101, the controller 200 accepts the task that involves the movement to the destination point via the user IF 250 or the communication IF 250. The destination point is determined in accordance with, for example, coordinates on the map displayed on the display panel 123 instructed by the user.

The controller 200 calculates the projection profile PJ of the moving robot 100 including the conveyance object 900 gripped by the hand 122 in the following Step S102. For example, the controller 200 acquires the captured image from the sensor unit 230 and analyzes the image or acquires the posture of the arm 121 and calculates the amount of projection from the main body part 120, thereby determining the projection profile PJ.

The controller 200 acquires the environmental map of the target space in which the robot will autonomously moves from the environmental map DB 241 or from an external device via the communication IF 250. Then in Step S104, the map correction unit 202 of the controller 200 performs correction of the environmental map that has been acquired based on the projection profile PJ calculated in Step S102. Specifically, for the environmental map in which the obstacle profile OB of the target space is described, as described with reference to FIGS. 4 and 5, the map correction unit 202 calculates the no-entry area NA by sweeping the projection profile PJ that corresponds to the turning angle. Then the environmental map of the three-dimensional structure in which the prohibition grids and the permission grids are defined as described with reference to FIGS. 6 and 7 is generated.

When the environmental map is completed, the step goes to Step S105, where the planning unit 201 executes the moving path calculation in accordance with the departure point grid $GD_s$ and the destination point grid $GD_g$. Specifically, as described above with reference to FIGS. 8 to 10, the provisional moving path in which the change in the turning angle does not become discontinuous is found. Then in Step S106, the planning unit 201 determines whether the provisional moving path has been found. When even one provisional moving path could not be found, the process goes to Step S113, where the controller 200 executes error processing such as displaying information indicating that the robot cannot go to the destination point on the display panel 123 and ends the series of processing. When the provisional moving path has been found, the process goes to Step S107.

In Step S107, the planning unit 201 determines whether a plurality of provisional moving paths have been found. If only one provisional moving path has been found, this provisional moving path is determined to be the moving path along which the moving robot 100 moves. When a plurality of provisional moving paths have been found, the process goes to Step S108, where one of the provisional moving paths is selected in accordance with a predetermined condition and the selected path is determined to be the moving path along which the moving robot 100 moves. Specifically, as described above, the provisional moving path in which the path cost calculated for each provisional moving path becomes minimum may be, for example, selected.

When the moving path is determined, the process goes to Step S109, where the planning unit 201 executes a movement posture calculation for determining the turning angle during the movement in the moving path. Specifically, first, as described with reference to FIG. 13, in the P$\theta$ plane, which is the path layer, grid trajectory candidates that connect the departure point grid $GD_s$ and the destination point grid $GD_g$ are found.

In Step S110, the planning unit 201 determines whether a plurality of grid trajectory candidates have been found. When only one grid trajectory has been found, this grid trajectory is determined to be the turning angle during the movement. When a plurality of grid trajectories have been found, the process goes to Step S111, where one grid trajectory is selected in accordance with a predetermined condition and this grid trajectory is determined to be the turning angle during the movement. Specifically, as described above, for example, the grid trajectory in which the turning angle cost added to the change in the turning angle in the path layer becomes minimum may be selected.

When the turning angle during the movement has been determined, it is determined that the movement plan to the destination point has been set. Then the process goes to Step S112, where the given task is executed. When the execution of the task is completed, a series of processing is ended.

While Step S104 for correcting the environmental map has been executed in the aforementioned flow, when, for example, the moving robot 100 does not convey the conveyance object 900, the environmental map of the three-dimensional structure created in advance based on the projection profile PJ of the moving robot 100 itself may be acquired in Step S103. Further, when it is planned to convey a specific conveyance object 900, the environmental map of the three-dimensional structure created based on the projection profile PJ in the state in which the moving robot 100 grips the conveyance object 900 may be acquired in Step S103. In these cases, Step S104 for correcting the environmental map needs not be executed.

While the moving robot 100 itself plans the moving path along which the robot autonomously moves from the departure point to the destination point and the turning angle, which is the posture of the moving robot during the movement in the moving path in the aforementioned embodiment, the entity that executes the movement plan may be provided other than the moving robot 100. For example, a server connected to the moving robot 100 via a network may serve as the movement planning apparatus. In this case, the server may be configured to acquire information such as the projection profile PJ from the moving robot 100 and correct the environmental map held in advance, thereby obtaining the environmental map for the moving robot 100. After the moving path along which the robot autonomously moves from the departure point to the destination point and the turning angle, which is the posture of the moving robot during the movement in the moving path are determined, the server may transmit these information items to the moving robot 100.

Whether to allow the moving robot 100 itself to include the movement planning apparatus or to cause, for example, the external server to serve as the movement planning apparatus may be selected in accordance with the purpose of using the moving robot 100 and the situation of the target space. When the moving robot 100 itself includes the movement planning apparatus, it is possible to definitely execute the autonomous movement even in an environment in which, for example, a communication environment is not good.

While the environmental map of the three-dimensional structure in which the target space is partitioned into the lattice-like grids, the spatial layer is created for each turning angle, and the spatial layers are layered on one another has been used in the aforementioned embodiment, the structure of the environmental map is not limited to this structure. Various kinds of environmental maps may be employed as long as the planning unit 201 is able to perform the two-stage determination for determining first the moving path while it is confirmed that the turning angle does not become discontinuous during the movement and then determining the optimal turning angle during the movement.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A movement planning apparatus configured to plan a moving path in which a moving robot autonomously moves from a departure point to a destination point, and a turning angle, which is a posture of the moving robot on a path of the moving path, the movement planning apparatus comprising:

a processor configured to:

acquire an environmental map in which a no-entry area is indicated for each of turning angles that the moving robot may have;

search for the moving path that allows at least one search branch to be extended from the departure point to the destination point based on the environmental map without making the change in the turning angle become discontinuous and without passing the no-entry area, and determine the turning angle on the moving path to the destination point based on a predetermined condition, wherein the environmental map includes a three-dimensional structure in which a spatial layer is provided for each of the turning angles and the spatial layers are layered on one another in an order of the turning angles, the spatial layer being a layer in which a target space where the moving robot autonomously moves is partitioned into lattice-like grids, and each of the grids is classified as one of a permission grid in which entry of the moving robot is permitted and a prohibition grid in which the entry is prohibited at the turning angle that is associated with the grid; and control the robot to move from the departure point to the destination point.

2. The movement planning apparatus according to claim 1, wherein the grid is classified as the prohibition grid when the grid includes a Minkowski difference between the profile of the moving robot at the turning angle associated with the grid and an obstacle that is present in the target space.

3. The movement planning apparatus according to claim 1, wherein processor is further configured to guarantee the continuity of the change in the turning angle by continuously connecting the grid that includes the departure point and the grid that includes the destination point through the permission grids that are adjacent to each other in the three-dimensional structure.

4. The movement planning apparatus according to claim 1, wherein, when the processor is further configured to find a plurality of paths when it determines the moving path, select a path in which a path cost calculated for each path becomes minimum and set the selected path to be the moving path.

5. The movement planning apparatus according to claim 1, wherein the processor is further configured to define a path layer, which is a set of the grids along the moving path that has been determined, perpendicular to the spatial layer in the three-dimensional structure, select a grid trajectory in which a turning angle cost added to the change in the turning angle in the path layer becomes minimum, and determine the turning angle on the path.

6. A moving robot comprising:

a movement planning apparatus configured to plan a moving path in which the moving robot autonomously moves from a departure point to a destination point, and a turning angle, which is a posture of the moving robot on a path of the moving path, the movement planning apparatus comprising a processor configured to:

acquire an environmental map in which a no-entry area is indicated for each of turning angles that the moving robot may have;

search for the moving path that allows at least one search branch to be extended from the departure point to the destination point based on the environmental map without making the change in the turning angle become discontinuous and without passing the no-entry area, and determine the turning angle on the moving path to the destination point based on a predetermined condition, wherein the environmental map includes a three-dimensional structure in which a spatial layer is provided for each of the turning angles and the spatial layers are layered on one another in an order of the turning angles, the spatial layer being a layer in which a target space where the moving robot autonomously moves is partitioned into lattice-like grids, and each of the grids is classified as one of a permission grid in which entry of the moving robot is permitted and a prohibition grid in which the entry is prohibited at the turning angle that is associated with the grid; and control the robot to move from the departure point to the destination point.

7. A non-transitory computer readable medium storing a movement planning program configured to plan a moving path in which a moving robot autonomously moves from a departure point to a destination point, and a turning angle, which is a posture of the moving robot on a path of the moving path, the movement planning program causing a computer to execute the following processing of:

an acquiring step for acquiring an environmental map in which a no-entry area is indicated for each of turning angles that the moving robot may have;

a moving path searching step for searching for the moving path that allows at least one search branch to be extended from the departure point to the destination point based on the environmental map without making the change in the turning angle become discontinuous and without passing the no-entry area;

a turning angle determining step for determining the turning angle on the moving path that has been searched based on a predetermined condition, wherein the environmental map includes a three-dimensional structure in which a spatial layer is provided for each of the turning angles and the spatial layers are layered on one another in an order of the turning angles, the spatial layer being a layer in which a target space where the moving robot autonomously moves is partitioned into lattice-like grids, and each of the grids is classified as one of a permission grid in which entry of the moving robot is permitted and a prohibition grid in which the entry is prohibited at the turning angle that is associated with the grid; and a controlling step for controlling the robot to move from the departure point to the destination point.

* * * * *